United States Patent [19]

Suman et al.

[11] Patent Number: 5,162,950
[45] Date of Patent: Nov. 10, 1992

[54] LIGHTED MIRROR ASSEMBLY FOR MOTOR VEHICLE VISOR

[75] Inventors: Michael J. Suman, Holland; Russell L. Clark, Zeeland, both of Mich.

[73] Assignee: Prince Corporation, Holland, Mich.

[21] Appl. No.: 350,596

[22] Filed: May 11, 1989

Related U.S. Application Data

[63] Continuation-in-part of Ser. No. 267,178, Nov. 4, 1988, Pat. No. 4,879,637.

[51] Int. Cl.$^5$ ............................................. F21V 33/00
[52] U.S. Cl. ................................. 359/871; 362/135; 362/140; 296/97.5
[58] Field of Search ............... 350/600, 631, 632, 277, 350/278, 582, 588; 362/135, 142, 136, 140; 219/219; 359/871 (U.S. only); 296/97.1, 97.5

[56] References Cited

U.S. PATENT DOCUMENTS

| | | | |
|---|---|---|---|
| 3,839,620 | 10/1974 | Seibel et al. | 219/219 |
| 3,887,788 | 6/1975 | Seibel et al. | 219/219 |
| 3,926,470 | 12/1975 | Marcus | 296/97 |
| 4,000,404 | 12/1976 | Marcus | 240/2 |
| 4,075,468 | 2/1978 | Marcus | 362/144 |
| 4,203,149 | 5/1980 | Viertel et al. | 362/144 |
| 4,213,112 | 7/1980 | Alman et al. | 338/183 |
| 4,227,241 | 10/1980 | Marcus | 362/61 |
| 4,227,242 | 10/1980 | Marcus | 362/61 |
| 4,435,691 | 3/1984 | Ginn | 338/125 |
| 4,491,899 | 1/1985 | Fleming | 362/74 |
| 4,494,789 | 1/1985 | Flowerday | 296/97 |
| 4,518,192 | 5/1985 | Canadas | 296/97 |
| 4,586,788 | 5/1986 | Hansen | 350/283 |
| 4,733,336 | 3/1988 | Skogler et al. | 362/142 |
| 4,744,645 | 5/1988 | Sharp | 350/631 |
| 4,760,503 | 7/1988 | VandenBerge et al. | 362/137 |
| 4,820,022 | 4/1989 | Demura et al. | 350/278 |
| 4,882,466 | 11/1989 | Friel | 219/219 |
| 4,940,317 | 7/1990 | Reuben | 219/219 |

FOREIGN PATENT DOCUMENTS 1959650  6/1971  Fed. Rep. of Germany ...... 219/219

Primary Examiner—Rodney B. Bovernick
Assistant Examiner—R. D. Shafer
Attorney, Agent, or Firm—Price, Heneveld, Cooper, DeWitt & Litton

[57] ABSTRACT

An illuminated vanity mirror assembly for a sun visor includes a resistor screen-printed on a polymeric film substrate mounted adhesively to the back face of a glass mirror. A wiper arm is coupled to the resistor for providing a variable resistance to control the illumination from a lamp coupled to the variable resistance.

11 Claims, 2 Drawing Sheets

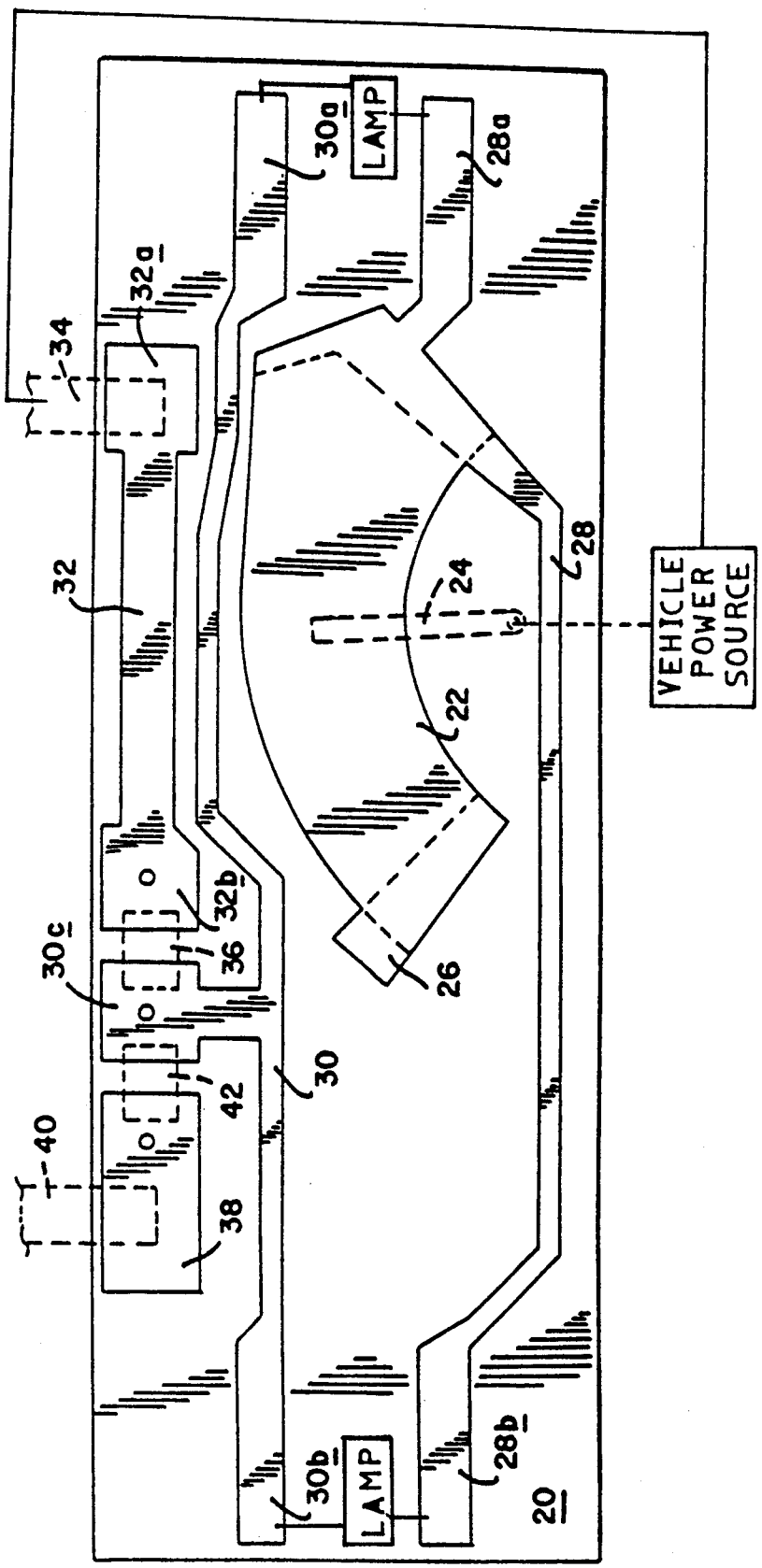

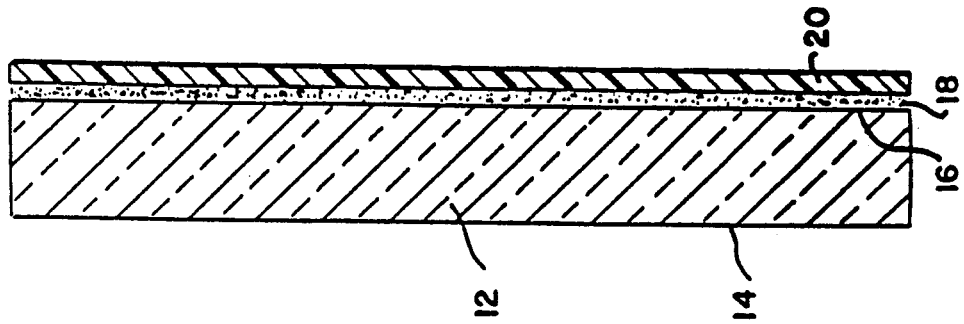
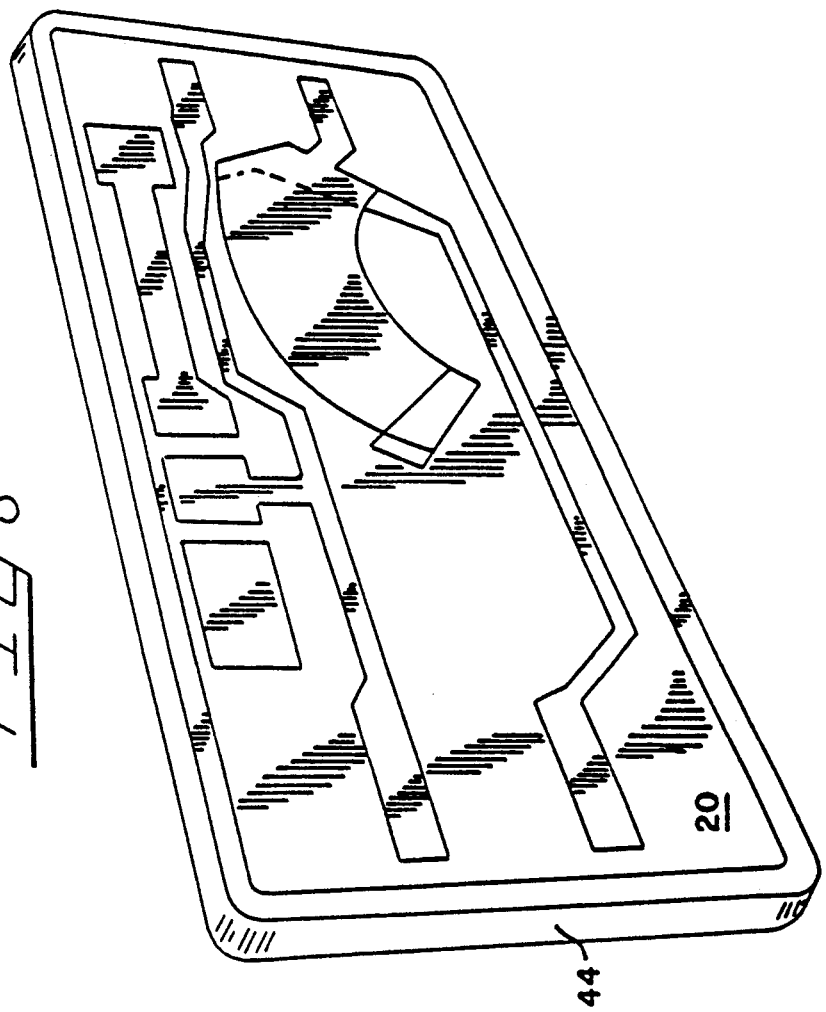

LIGHTED MIRROR ASSEMBLY FOR MOTOR VEHICLE VISOR

The present application is a continuation-in-part application of pending application Ser. No. 267,178 filed Nov. 4, 1988, now U.S. Pat. No. 4,879,637, entitled LIGHT CONTROL CIRCUIT FOR VANITY MIRROR ASSEMBLY. The subject matter of this prior application is incorporated herein by reference.

BACKGROUND OF THE INVENTION

This invention pertains to an improved mirror assembly of a type which can be lighted and which can be built into a sun visor for an automobile or other motor vehicle. Such an assembly may be called a lighted vanity mirror assembly.

It is known for a lighted vanity mirror assembly of the type noted above to be provided with one or more lamps, which may be energized by means of an electrical circuit including a switch, and for the electrical circuit to be mounted, along with the mirror, in a plastic case having a hinged cover and being built into a sun visor. When the cover is swung by a user from a closed position, in which the cover lies over the mirror, to an opened position, a mirror is uncovered and the switch is actuated by the swinging cover so as to energize the lamp or lamps, which illuminates or illuminate the mirror. See, for example, U.S. Pat. Nos. 3,926,470, 4,000,404, 4,075,468, and 4,227,241.

As exemplified in the patents noted above, a metal backing member, which supports discrete components of the electrical circuit, may be adhered to a vanity mirror, over its back face, by means of an adhesive backing strip of polyurethane foam or similar material. The backing strip covers and adheres to the back face of the mirror so as to prevent the shards of mirror glass from falling if the mirror happens to shatter. U.S. Pat. No. 3,375,364 discloses a vinyl or other polymeric backing member adhered to the back face of a vanity mirror for a similar purpose.

Heretofore, a lighted vanity mirror assembly of the type noted above has been regarded as a somewhat difficult to manufacture and somewhat expensive accessory. There has been a need, to which this invention is addressed, for a simpler, less expensive way to make a lighted vanity mirror assembly of the type noted above.

SUMMARY OF THE INVENTION

It is a principal object of this invention to provide an improved mirror assembly of the type noted above. The mirror assembly, which can be lighted, can be built into a sun visor for an automobile or other motor vehicle.

Specifically, the mirror assembly comprises a glass mirror, a polymeric film substrate mounted adhesively to the back face of the mirror, preferably over substantially the full expanse of the back face of the mirror, and electrical circuit components printed on the substrate. Such components may be screen-printed on the substrate in particle-laden polymeric inks, which may be carbon particle-laden polymeric inks for printing of resistive components and silver particle-laden polymeric inks for printing of conductive components. The substrate and electrical components printed thereon exemplify what is called polymer thick film circuitry.

The components printed on the substrate include a heat-dissipative component, such as a resistive component of a voltage divider, and may include conductive components as well. The mirror serves as a heat sink for the components printed on the substrate. If the mirror happens to shatter, shards of the mirror tend to be adhesively retained by the substrate.

The substrate protects metallization on the back face of the mirror against being scratched. The substrate is made from poly(ethylene terephthalate) film, which is preferred for its dielectric properties, or from another type of polymeric film. A layer of adhesive is used between the mirror and the substrate. The adhesive is sufficiently thin to facilitate heat transfer from the components printed on the substrate, particularly the heat-dissipative component, to the mirror, which as mentioned above serves as a heat sink. If the mirror happens to shatter, the adhesive tends to prevent shards of the mirror from falling.

These and other objects, features and advantages of this invention will be better understood from the following description of a preferred embodiment of this invention with the aid of the accompanying drawings.

BRIEF DESCRIPTION OF THE DRAWINGS

FIG. 1 is a back view of the mirror assembly constituting a preferred embodiment of this invention.

FIG. 2 is an edge view of the mirror assembly of claim 1.

FIG. 3 is a perspective view of the mirror assembly of claim 1, as combined with a frame.

DETAILED DESCRIPTION OF THE PREFERRED EMBODIMENT

As show in the drawings, a mirror assembly 10 comprises a rectangular mirror 12, which is made of clear glass, and which has a front face 14 and a rear, metallized face 16. A thin adhesive layer 18 is applied substantially over the full expanse of the rear face 16 of the mirror 12. A rectangular film substrate 20, which preferably is made of poly(ethylene terephthalate) film having electrical components of a DC circuit screen-printed thereon, is adhered to the rear face 16 of the mirror 12, over the full expanse of the rear face 16, by means of the adhesive layer 18. The film substrate 20 and electrical components printed thereon exemplify what is called polymer thick film circuitry. The components printed on the substrate 20 include a resistive component 22 and various conductive components to be hereinafter described. In keeping with known practice in polymer thick film circuitry, the resistive component 22 is screen-printed in carbon particle-laden polymeric ink, and the conductive components are screen-printed in silver particle-laden polymeric ink. The resistive component 22, which is heat-dissipative, serves as the resistive component of a voltage divider, which also comprises a wiper 24 shown in phantom lines in FIG. 1. The wiper 24 may be mechanically coupled to an external control (not shown) which may be manually actuated by a user so as to control the level of illumination of the mirror assembly 10.

Among the conductive components printed on the film substrate 20, a conductive component 26 overlaps a left-end portion of the resistive component 22, and a conductive component 28 overlaps a right-end portion of the resistive component 22. The conductive component 28 extends in a rightward direction, as shown, so as to provide a positive electrode 28a for a lamp (not shown) at the right end of the mirror assembly 10. The conductive component 28 extends in a leftward direction, as shown, so as to provide a positive electrode 28b for a lamp (not shown) at the left end of the mirror assembly 10. Similarly, a conductive component 30, which is spaced from the conductive component 28 and the resistive component 22 so as to be electrically insulated therefrom by intermediate portions of the film substrate 20, extends in a righthand direction, as shown, so as to provide a negative or ground electrode 30a for the lamp at the right end of the mirror assembly 10 and extends in a leftward direction, as shown, so as to provide a negative or ground electrode 30b for the lamp at the left end of the mirror assembly 10. Likewise, a conductive component 32 printed on the film substrate 20 enables a negative or ground connection for both lamps to be made at the right side of the mirror assembly 10, by means of an external electrode 34 contacting the conductive component 32 at its right end 32a and by means of an external electrode 36 connecting the conductive component 32 at its left end 32b to a common portion 30c of the conductive component 30. Moreover, a conductive component 38 printed on the film substrate 20 enables a negative or ground connection to be made at the left side of the mirror assembly 10, by means of an external electrode 40 contacting the conductive component 38 and by means of an external electrode 42 connecting the conductive component 38 to the common portion 30c of the conductive component 30. The external electrodes 34, 36, 40, 42, which may be metal leaf springs, are shown in phantom lines. If the external electrodes 34, 36 are used, the external electrodes 40, 42 are omitted. If the external electrodes 40, 42 are used, the external electrodes 34, 36 are omitted.

Direct current from the motor vehicle battery, generator, or alternator of the motor vehicle is provided to the mirror assembly 10 through the wiper 24 and is returned through whichever of the external electrodes 34, 40 are used. The lamps noted above may be of a conventional type having electrodes at each end. The mirror assembly 10 may be built into a sun visor in a known manner, in connection with which reference may be had to prior patents noted above for further details outside the scope of this invention.

Advantageously, the mirror serves as heat sink for the heat-dissipative component 22 and other electrical components printed on the substrate 20. The adhesive layer 18 is sufficiently thin to facilitate heat transfer from such components, particularly the heat-dissipative component 22, to the mirror 20. Nonetheless, if the mirror 20 happens to shatter, which may happen, for example, if it is heated or cooled too rapidly or if it is struck accidentally, the adhesive layer 18 tends to prevent shards of the mirror from falling. The shards tend to adhere to the adhesive layer 18.

It will be appreciated that this invention provides a simple, inexpensive way to make a lighted vanity mirror assembly of the type noted above.

It is contemplated by the following claims to cover all modifications and improvements coming within the true spirit and scope of this invention.

We claim:

1. For use in a vehicle visor, a vanity mirror assembly for providing variable illumination for use of the vanity mirror in low ambient light conditions, said mirror assembly comprising a glass mirror having a back face, a polymeric film substrate mounted adhesively to the back face of said mirror, and electrical circuit components printed on said substrate, said components including a resistor element printed on said substrate and a wiper associated with said resistor element for defining a variable resistance; said component further including means for receiving at least one lamp for the illumination of said mirror, terminals for receiving operating power from a vehicle power source and means for coupling said variable resistance to said terminals such that a lamp received by said assembly can be selectively activated to control the intensity of light therefrom.

2. The mirror assembly of claim 1 wherein the substrate covers and is mounted adhesively over substantially the full expanse of the back face of the mirror.

3. The mirror assembly of claim 2 further comprising a layer of adhesive mounting the substrate to the back face of the mirror.

4. The mirror assembly of claim 1 wherein said components are screen-printed on the substrate in particle-laden polymeric inks.

5. The mirror assembly of claim 1 wherein said resistor element is a resistive component of a voltage divider.

6. The mirror assembly of claim 5 wherein said resistor element is screen-printed on the substrate in carbon particle-laden polymeric ink.

7. The mirror assembly of claim 6, wherein the substrate covers and is mounted adhesively over substantially the full expanse of the back face of the mirror.

8. The mirror assembly of claim 7 further comprising a layer of adhesive mounting the substrate to the back face of the mirror.

9. A mirror and circuit for use in an illuminated vanity mirror assembly for a vehicle visor comprising:
    a mirror having a size and shape to fit in a vehicle visor and having a forward reflective side and a rear surface;
    a polymeric film substrate including an electrical circuit formed on one side thereof, said electrical circuit including a pair of spaced electrodes near opposite ends of said mirror for receiving lamps for the illumination of said mirror, said circuit further including a resistance element coupled to said electrodes for controlling illumination from said lamps coupled to said electrodes; and
    adhesive means coupling said film substrate to said rear surface of said mirror.

10. The apparatus as described in claim 9 wherein said adhesive means is integral with said polymeric film.

11. The apparatus as described in claim 9 and further including a wiper arm coupled to said resistance element to form a voltage divider for varying the illumination from lamps coupled to said electrodes.

* * * * *

UNITED STATES PATENT AND TRADEMARK OFFICE
CERTIFICATE OF CORRECTION

PATENT NO. : 5,162,950
DATED : November 10, 1992
INVENTOR(S) : Michael J. Suman et al.

It is certified that error appears in the above-identified patent and that said Letters Patent is hereby corrected as shown below:

Column 2, Line 32;

"show" should be --shown--.

Column 4, Claim 1, Line 10;

"component" should be --components--.

Signed and Sealed this

Fourth Day of January, 1994

Attest:

BRUCE LEHMAN

Attesting Officer    Commissioner of Patents and Trademarks